3,810,941
PLICATAMIDES
Richard Frank Buchholz and Marten Reintjes, Shelton, Wash., assignors to International Telephone and Telegraph Corporation, New York, N.Y.
No Drawing. Filed Dec. 18, 1972, Ser. No. 316,056
Int. Cl. C07c 103/26
U.S. Cl. 260—559 R      3 Claims

ABSTRACT OF THE DISCLOSURE

A plicatamide of the structural formula

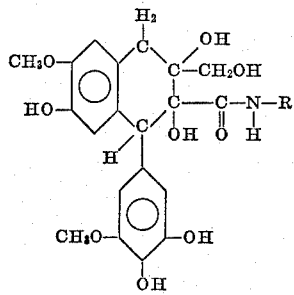

wherein R is selected from the group consisting of ethyl and n-propyl. The compounds are prepared by reacting methyl plicatate with a primary amine in aqueous solution, acidifying and recovering the plicatamide. The compounds exhibit excellent antioxidant activity for edible fats and oils and good lipid solubility.

---

This invention relates to plicatamide compounds and to their use as antioxidants for oils and fats.

Plicatic acid is one of the principal components of the complex mixture of phenolic compounds present in the aqueous extract of western red cedar. Plicatic acid is known to be an antioxidant for edible fats and oils. Esters of plicatic acid and their use as antioxidants are shown in U.S. Pat. 3,644,481. The p-bromanilide of tri-O-methyl-plicatic acid is shown in an article entitled "Polyoxyphenols of Western Red Cedar," by Gardner et al., Can. Journal of Chemistry, pages 52–58, volume 44 (1966).

It is a principal object of the present invention to provide a new class of plicatic acid derivatives, particularly useful as antioxidants for edible fats and oils.

The present invention is directed to plicatamide compounds having the structural formula

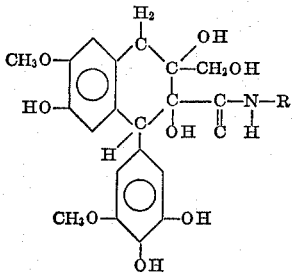

wherein R is selected from the group consisting of ethyl and n-propyl. These compounds have been found to possess a combination of unique antioxidant properties, unique with respect to the other plicatates as well as other plicatamides. The compounds of the invention possess outstanding antioxidant activity, surprisingly high lipid solubility and good taste characteristics in vegetable oils and fats. In addition, they are nontoxic and non-irritating to the skin. It has also been found that their effectiveness as antioxidants may be further enhanced when used together with thiodipropionic acid.

The plicatamides of the invention may be prepared by reacting either methyl plicate or plicatin with the appropriate amine. The preferred method involves the reaction of methyl plicatate with n-propyl amine or ethyl amine in a water solvent. This method has a number of advantages over the preparation from plicatin including the use of methyl plicatate which is cheaper and more readily available than plicatin. Water is used as the reaction medium and no special reaction vessels are required since the reaction does not require heating or pressure. The reaction time is fast and yields of about 80% are obtained. The amides are obtained as pure white crystalline products with one crystallization.

Plicatin, the plicatic acid lactone, is prepared from plicatic acid by the removal of one molecule of water from the adjoining carboxylic acid and hydroxymethyl radicals of the plicatic acid molecule. This may be accomplished by heating pure amorphous plicatic acid to a temperature of above about 130° C. in the substantial absence of oxygen. Methyl plicatate may be prepared by a number of routes including the direct esterification of crude red cedar extracts with methyl alcohol in the presence of an acid catalyst such as sulfuric acid. The preparation of methyl plicatate by this route, as well as others, is more fully disclosed in the aforementioned U.S. Pat. 3,644,481. The preparation of plicatic acid by extraction from red cedar wood with aqueous solvent is described by Gardner, Barton and MacLean in Canadian J. Chem., vol. 37, 1703–9 (1959) and by Gardner in Publication No. 1023, Department of Forestry, Canada (1963).

The following examples illustrate the preparation of the plicatamides of the invention.

EXAMPLE 1

Methyl plicatate (500 g., 1.14 moles) was stirred under nitrogen in 1500 ml. of water for 1 hour after which 400 ml. (4.9 moles) of n-propyl amine was added. The reaction mixture was stirred for 2 hours followed by acidification with 350 ml. of conc. hydrochloric acid. The hot solution (50° to 60° C.) was filtered and the filtrate allowed to crystallize overnight in an ice bath. The crystals were filtered off and vacuum oven dried. The yield was 410 g. (0.0885 mole) or 77.6% theoretical.

The N-n-propyl plicatamide was recrystallized by heating 36 g. in 36 ml. of methanol followed by the addition of 100 ml. of ethyl acetate with vigorous stirring. After stirring over the weekend, the crystals were filtered and washed with ethyl acetate. The weight of oven dried crystals was 30 g. or 83%. The melting point after recrystallization from methanol-ethyl acetate was 224–226° C. determined with a Thomas capillary melting point apparatus. Thin layer chromatography on Brinkmann MN silica gel N-HR using benzene (100), 95% enthanol (20) solvent system and iodine developer gave a single spot with $R_f$ 0.15. Elemental analysis gave 59.23% C, 6.15% H and 3.02% N for theoretical values of 59.62% C, 6.30% H, 3.02% N ($C_{22}H_{29}O_9N$).

EXAMPLE 2

Methyl plicatate (500 g., 1.11 mole) was stirred in 1400 ml. water under nitrogen for 1 hour followed by addition of ethyl amine (400 ml. of 70% solution, 6 moles). The reaction mixture was stirred for 2 hours and the solution acidified with 350 ml. of 36% hydrochloric acid. The hot reaction mixture was filtered and, after crystallizing overnight in an ice bath, the crystals were collected by filtration, yield 360 g. (0.798 moles or 71.9% theory). The N-ethyl plicatamide, recrystallized from methanol water, had uncorrected M.P. of 273–274.5%.

The N-n-propyl and the N-ethyl plicatamides were evaluated as antioxidants in edible oils and fats and compared with two food additives, butylated hydroxyanisole (BHA) and butylated hydroxytoluene (BHT), both of which have been widely used for over 20 years to prevent oxidation of fats. Plicatenol the most effective antioxidant of the know plicatic acid derivatives was also evaluated for comparative purposes. These tests were carried out as follows.

EXAMPLE 3

A total of 16 samples of safflower oil and tallow, 50 grams each, were weighed into 150 ml. beakers. A total of 14 samples of the various antioxidants were weighed into microbeakers at a concentration of 0.01% based on the weight of oil or fat. BHT and BHA were combined to give a total concentration of 0.01%. The antioxidant-chemicals were dissolved in a small quantity of absolute ethanol and transferred quantitatively into the fat and oil. The latter two were slightly heated to evaporate the ethanol and placed in an air-circulating oven at 60° C.±2 for a Schall test, a standard test for determining rancidity of fats and oils.

The results of the rancidity tests with both safflower oil and tallow were measured in terms of peroxide values (milliequivalents/1000 g.) vs. time in hours. The results showed that apart from plicatenol, N-$n$-propyl plicatamide had the greatest antioxidant activity and that both the N-n-propyl and the ethyl plicatamide exceeded BHT and BHA, the conventional food antioxidants, in effectiveness. Plicatenol—a pyrolysis product of plicatic acid—had the highest antioxidant properties of the compounds tested. However, plicatenol has only marginal lipid solubility and is very difficult to prepare and purify.

Additional studies were made to determine the solubility and taste characteristics of the plicatamides. These properties are of crucial importance to their use as antioxidants with edible fats and oils. Normally, the plicatamides of the invention are effective as antioxidants in amounts from about 20 to 150 parts per million (p.p.m.) in foodstuffs containing oils and fats. Thiodipropionic acid may be used in an amount of from about 0.5 to 10 parts of plicatamide to one part of the acid. N-$n$-propyl plicatamide has an unexpectedly large solubility in oil—500 p.p.m.—which is over twice the solubility in oil of the corresponding $n$-propyl ester—200 p.p.m. Its solubility in water—200 p.p.m.—is also greater than that of the corresponding ester and greater than any other known plicatic acid derivatives other than the free acid or its salts. N-ethyl plicatamide is twice as soluble at 200 p.p.m. as the corresponding ester at 100 p.p.m.

Both the $n$-propyl and ethyl plicatamides have unusually low taste characteristics. The ethyl plicatamide is almost tasteless in both oil and water. The propyl plicatamide is absolutely tasteless in oil and bitter, although not objectionably so, in water. Again, this contrasts with the corresponding esters which either are bitter—or have a pronounced nutty and astringent taste—in both water and oil.

Other plicatamides were prepared and found to be deficient as food antioxidants in terms of organoleptic properties or stability. For example, N-hexyl plicatamide has a very bitter taste, while plicatamide (where R is hydrogen in the formula above) turned color on standing. Other amides such as N-$n$-octyl plicatamide have good lipid solubility but are extremely bitter.

We claim:
1. A plicatamide of the structural formula

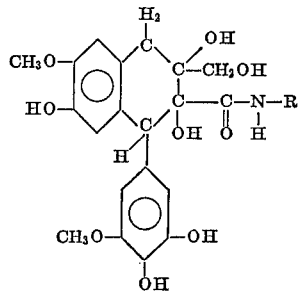

wherein R is selected from the group consisting of ethyl and n-propyl.
2. The plicatamide of claim 1 in which R is ethyl.
3. The plicatamide of claim 1 in which R is n-propyl.

References Cited
UNITED STATES PATENTS
3,719,280    3/1973    Houlihan et al. _____ 260—559

HARRY I. MOATZ, Primary Examiner

U.S. Cl. X.R.
99—163, 164